United States Patent
Chakraborty et al.

(10) Patent No.: US 9,229,885 B2
(45) Date of Patent: Jan. 5, 2016

(54) ADAPTIVE SCHEDULING QUEUE CONTROL FOR MEMORY CONTROLLERS BASED UPON PAGE HIT DISTANCE DETERMINATIONS

(71) Applicants: Arup Chakraborty, Austin, TX (US); Jaksa Djordjevic, Austin, TX (US)

(72) Inventors: Arup Chakraborty, Austin, TX (US); Jaksa Djordjevic, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 97 days.

(21) Appl. No.: 14/283,780

(22) Filed: May 21, 2014

(65) Prior Publication Data

US 2015/0339245 A1  Nov. 26, 2015

(51) Int. Cl.
*G06F 12/02* (2006.01)
*G06F 13/16* (2006.01)
*G11C 7/10* (2006.01)

(52) U.S. Cl.
CPC ........ *G06F 13/1626* (2013.01); *G06F 13/1673* (2013.01); *G11C 7/1072* (2013.01)

(58) Field of Classification Search
CPC ............ G06F 13/1626; G06F 13/1673; G11C 7/1072
USPC .................................. 711/106, 118, 154, 156
See application file for complete search history.

(56) References Cited

U.S. PATENT DOCUMENTS

| | | | | | |
|---|---|---|---|---|---|
| 6,154,826 | A * | 11/2000 | Wulf | ...................... | G06F 8/4442 711/167 |
| 6,510,099 | B1 * | 1/2003 | Wilcox | ................ | G06F 13/1673 365/189.05 |
| 6,510,497 | B1 * | 1/2003 | Strongin | ............. | G06F 13/1626 710/309 |
| 6,546,439 | B1 * | 4/2003 | Strongin | ................... | G06T 1/60 710/52 |
| 6,567,416 | B1 * | 5/2003 | Chuah | ................. | H04L 12/2602 370/347 |
| 7,127,573 | B1 * | 10/2006 | Strongin | ............... | G06F 1/3203 711/151 |
| 8,245,232 | B2 * | 8/2012 | Mutlu | ................. | G06F 13/1663 712/214 |
| 8,560,796 | B2 | 10/2013 | Xu et al. | | |
| 8,738,860 | B1 * | 5/2014 | Griffin | ................ | G06F 12/0897 711/122 |
| 8,873,329 | B1 * | 10/2014 | Zheng | ...................... | G11C 8/08 365/230.01 |
| 9,087,017 | B2 * | 7/2015 | Mace | ................... | G06F 13/1626 |
| 9,104,531 | B1 * | 8/2015 | Shumsky | ................ | G06F 12/00 |

(Continued)

OTHER PUBLICATIONS

Rixner, "Memory Controller Optimizations for Web Servers", IEEE Computer Society, 37th International Symposium on Microarchitecture, 12 pgs. (2004).

(Continued)

*Primary Examiner* — Stephen Elmore

(74) *Attorney, Agent, or Firm* — Egan, Peterman, & Enders LLP.

(57) ABSTRACT

Methods and systems are disclosed for adaptive scheduling queue control based upon page hit distance determinations. A threshold occupancy value is determined for a window of previous access requests to a memory and used to adaptively control a number of access requests stored in a scheduling queue buffer. For certain embodiments, a page hit distance (PHD) determination for each access request and historical page hit distance data is used to adjust the threshold occupancy value that determines the number (N) of access requests stored in the buffer prior to removing an access request and using it to access the memory. For each access request, the page hit distance represents the number of previously received access requests since the last access request to access the same page of memory. An average PHD can be determined over a number (M) of previous access requests and used to control the threshold occupancy value.

20 Claims, 4 Drawing Sheets

(56) References Cited

U.S. PATENT DOCUMENTS

| | | | | |
|---|---|---|---|---|
| 9,117,299 B2* | 8/2015 | Kuo | ............... | G06T 1/60 |
| 2011/0276766 A1* | 11/2011 | Fullerton | ............... | G06F 1/3206 711/149 |
| 2012/0210055 A1* | 8/2012 | Mace | ............... | G06F 13/1626 711/105 |
| 2014/0201471 A1* | 7/2014 | Cutter | ............... | G06F 13/1663 711/151 |
| 2014/0281121 A1* | 9/2014 | Karamcheti | ............... | G06F 12/0246 711/102 |
| 2014/0281133 A1* | 9/2014 | Karamcheti | ............... | G06F 12/0246 711/103 |
| 2014/0281152 A1* | 9/2014 | Karamcheti | ............... | G06F 12/0246 711/103 |
| 2014/0331021 A1* | 11/2014 | Kim | ............... | G06F 13/1689 711/167 |

OTHER PUBLICATIONS

Ipek et al., "Self-Optimizing Memory Controllers: A Reinforcement Learning Approach", IEEE Computer Society, International Symposium on Computer Architecture, 12 pgs. (2008).

* cited by examiner

ADAPTIVE SCHEDULING QUEUE CONTROL FOR MEMORY CONTROLLERS BASED UPON PAGE HIT DISTANCE DETERMINATIONS

TECHNICAL FIELD

This technical field relates to memory controllers and access request schedulers for memory controllers.

BACKGROUND

Memory controllers are used in SoC (system on chip) architectures to control access to memory such as a dynamic random access memory (DRAM). However, even though memory speeds have steadily increased, the performance of memory controllers such as DRAM controllers (DRCs) has not kept up with the performance capabilities of other circuitry within SoC architectures.

Memories, such as DRAMs, are often organized into multiple banks, each having multiple pages. At a given time, only one page per bank may remain open and accessible to memory access requests. A memory access to a page other than currently open pages results in a page miss. A page miss may require closing of the currently open page in the target bank followed by opening of the requested page. This page change results in performance loss. On the other hand, a memory access to a currently open page (which is opened by one of the previous memory accesses) is said to be a page hit which is considerably faster than a page miss. Prior DRC solutions, therefore, have prioritized page hits over page misses whenever possible. For example, to improve efficiency, DRC solutions have used access scheduling to prioritize page hits by storing access requests in a queue and then choosing stored accesses out of order to maximize page hits within the DRAM being accessed by the SoC.

For one prior DRC solution, the DRC maintains a scheduling queue (SQ) for incoming access requests. Access requests are added to the SQ in the order of the arrival, and access requests are removed from the SQ based on a scheduling policy. Once removed from the SQ, an access request is sent to an access timing controller that in turn sends appropriate access commands to the DRAM while maintaining DRAM timing constraints. One prior scheduling policy can be summarized as follows for each access request within the SQ: (1) select oldest request that has timed out to avoid starvation, and if none available, then (2) select oldest request that is a page hit, and if none available, then (3) select oldest request that is ready to be processed. For this prior scheduling policy, the performance improvement depends on the occupancy of the SQ. As such, increasing the number of access requests stored in the SQ will also increase the probability of exploiting page hits for the access requests thereby leading to an improved page hit rate. Thus, one prior technique is to slow or throttle DRAM accesses in order to increase the SQ occupancy and thereby increase the page hit rate. This throttling mechanism is based upon a predetermined fixed delay timer and is unaware of actual run-time workload characteristics for the memory. Although this throttling technique increases the SQ occupancy, this increase of SQ occupancy itself can cause an undesirable reduction in the speed and efficiency of memory accesses.

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale.

DETAILED DESCRIPTION

Figure 1:
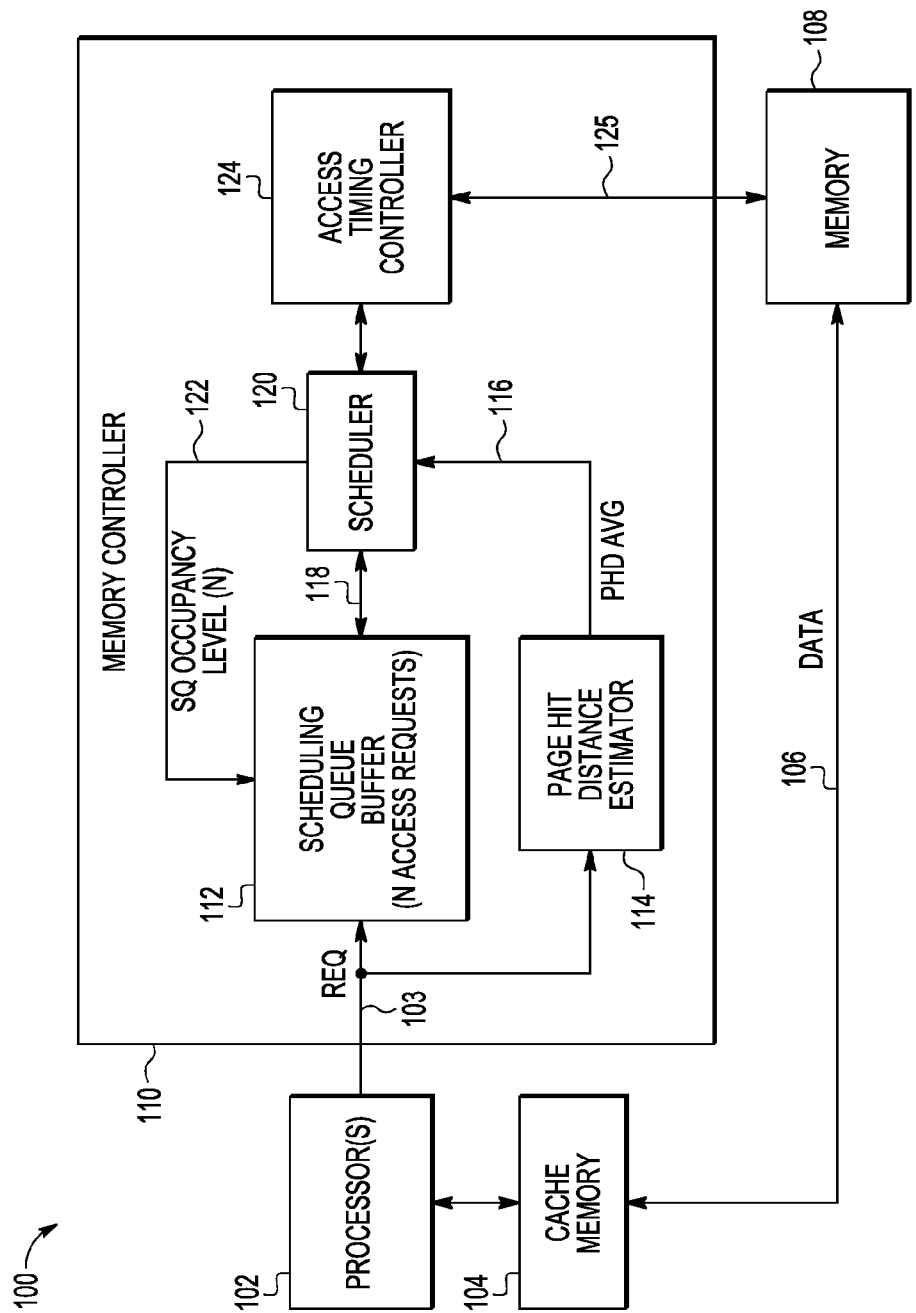
FIG. 1 is a block diagram of an example embodiment for a system on a chip (SoC) having a memory controller that controls accesses to a memory using an adaptive scheduling queue control that is adjusted based upon page hit distance determinations.

Methods and systems are disclosed for adaptive scheduling queue control based in part upon page hit distance determinations. A threshold occupancy value is determined for a window of previous access requests to a memory and used to adaptively control a number of access requests stored in a scheduling queue (SQ) buffer. For certain embodiments, a page hit distance determination for each access request and historical page hit distance data is used to adjust the threshold occupancy value that determines the number (N) of access requests stored in the SQ buffer. For each access request, the page hit distance (PHD) represents the number of previously received access requests since the last access request to access the same page of memory. An average PHD is determined over a number (M) of previous access requests and is used to control the threshold occupancy value. The scheduler waits until N access requests are stored within the SQ buffer before removing an access request from the SQ buffer and using it to access the memory. As such, the disclosed embodiments increase the likelihood of page-hit access requests while reducing memory access inefficiencies such as an unnecessary increase in latency. Different features and variations can be implemented, as desired, and related or modified systems and methods can be utilized, as well.

As recognized with respect to the embodiments described herein, for different workloads and different execution environments, there is a trade-off between increasing SQ occupancy and releasing access requests to allow memory accesses. Even though boosting scheduling queue (SQ) occupancy can be beneficial, throttling back accesses to the memory (e.g., dynamic random access memory (DRAM) or other memories) to maintain high SQ occupancy may negatively impact performance and even lead to deadlock for workloads with low numbers of outstanding access requests. Even for workloads that generate sufficient numbers of outstanding access requests, using non-adaptive and pre-determined throttling mechanism may unnecessarily increase latency without producing a performance benefit, for example, if there is frequent page reuse.

As described herein, a scheduler for a memory controller uses a threshold occupancy level to adaptively adjust SQ occupancy during operations of the system using the memory. In certain embodiments, the threshold occupancy level is based upon a page hit distance (PHD) determined for each received request, and a adaptively calculated average PHD can be used to adjust the threshold occupancy value, as described in more detail below. During operations, the scheduler waits to release access requests until the SQ buffer has reached the adaptively adjusted threshold occupancy level. Once the SQ buffer has reached this threshold occupancy level, the scheduler removes an access request from the SQ buffer and sends it to an access timing controller for use in accessing the memory. In addition to adaptively adjusting the level of SQ occupancy, the scheduler can also prioritize page hits over other accesses. As compared to prior solutions, the disclosed embodiments provide for an increased likelihood of having access requests within the SQ buffer representing page hits while reducing efficiency losses due to the non-adaptive, pre-determined, and/or fixed access throttling provided in prior solutions.

While the memory is primarily described herein as a DRAM (dynamic random access memory) that can include one or more arrays of DRAM memory cells within one or more integrated circuits, it is noted that other memories could also be used with the disclosed embodiments. For example, a static random access memory (SRAM), non-volatile memory, and/or other memories including arrays of memory cells could also be used with respect to the disclosed embodiments. It is further noted that the memory being accessed by the embodiments described herein is assumed to be organized such that the memory stores multiple pages of data that can be accessed through a memory access request. Each access request in part identifies one of the plurality of stored pages of data within the memory that is to be accessed by the access request. Once the access request is processed and the page identified in the request is accessed within the memory, data from the page is output for use by the accessing device or circuitry that initiated the access request. As indicated above, increasing page hits from access to access will improve performance.

FIG. 1 is a block diagram of an example embodiment 100 for a system on a chip (SoC) having a memory controller 110 that controls access to a memory 108, such as a DRAM. Embodiment 100 includes one or more processor(s) 102, cache memory 104, memory controller 110, and memory 108. In part, the processor(s) 102 execute instructions transferred to the cache memory 104 from the memory 108 and also uses the cache memory 104 for reading and writing data associated with these instructions. The cache memory 104 loads data 106 from the memory 108 based upon memory control signals 125 received from the memory controller 110. If the cache memory 104 does not already hold information for an address needed by the processor(s) 102, the processor(s) send a access request (REQ) 103 to the memory controller 110, which in turn provides the memory control signals 125 to the memory 108. As described above, the memory 108 stores multiple pages of data, and each request 103 identifies a page within the memory 108 to be accessed.

The memory controller 110 uses a adaptively adjusted threshold SQ occupancy level (N) 122 from the scheduler 120 to control the number of accesses stored within the scheduling queue buffer 112. Page hit distance (PHD) information, such as the average PHD value 116, from the page hit distance (PHD) estimator 114 is used by the scheduler 120 to adjust the threshold SQ occupancy level (N) 122 adaptively as the system operates. For example, the PHD estimator 114 can determine the average PHD value 116 based upon access requests 103 received from the processor(s) 102 over a window of previous access requests, and the threshold SQ occupancy level (N) 122 can be set equal to the average PHD value 116. The threshold SQ occupancy level (N) 122 determines the number (N) of access requests (e.g., $A_0$ to $A_{N-1}$ access requests) that are stored within the scheduling queue buffer 112 before the scheduler 120 will remove an access request from the buffer 112 through control and data connections 118 and provide it to the access timing controller 124. Access requests can also be removed by the scheduler 120 to prioritize page hits, on a first-in-first-out (FIFO) basis, and/or based upon other desired parameters. In part, when the scheduling queue buffer 112 reaches N access requests as determined by the threshold occupancy level (N) 122, the scheduler 120 removes an access request from the buffer 112 and provides it to access timing controller 124, which in turn provides the memory control signals 125 to the memory 108 to access the page identified by the released access request. Data 106 associated with this accessed page is then transferred to the cache memory 104 for use by the requesting processor(s) 102. It is noted that while the embodiment above sets the threshold SQ occupancy level (N) 122 equal to the average PHD value 116, the threshold SQ occupancy level (N) could also be determined by the historical access request information, the historical PHD information, and/or the average PHD value 116 using other relationships, while still having the threshold SQ occupancy level (N) be adaptively adjusted based upon historical data for previous access requests.

It is noted that the embodiment 100 can be integrated within a single integrated circuit and/or within multiple integrated circuits. Further, the processor(s) 102, cache memory 104, and memory controller 110 can be integrated within one integrated circuit, and the memory 108 can be integrated within one or more additional integrated circuits. The processor(s) 102 can be one or more microcontrollers, central processing units, microprocessors, configurable logic devices, and/or any other desired processing devices. The memory 108 can be one or more internal and/or external memory circuits that together form an accessible data storage medium for data to be used by the processor(s) 102. The cache memory 104 can also be one or more internal and/or external memory circuits that together form an accessible data storage medium for data to be used by the processor(s) 102. Further, one or more electrical buses and/or interfaces can be used to provide communications between the blocks depicted within embodiment 100. In one embodiment, the processor(s) 102, the cache memory 104, and the memory controller 110 are integrated within one integrated circuit, and the memory is integrated within one or more integrated circuits. Other variations could also be implemented.

Figure 2:
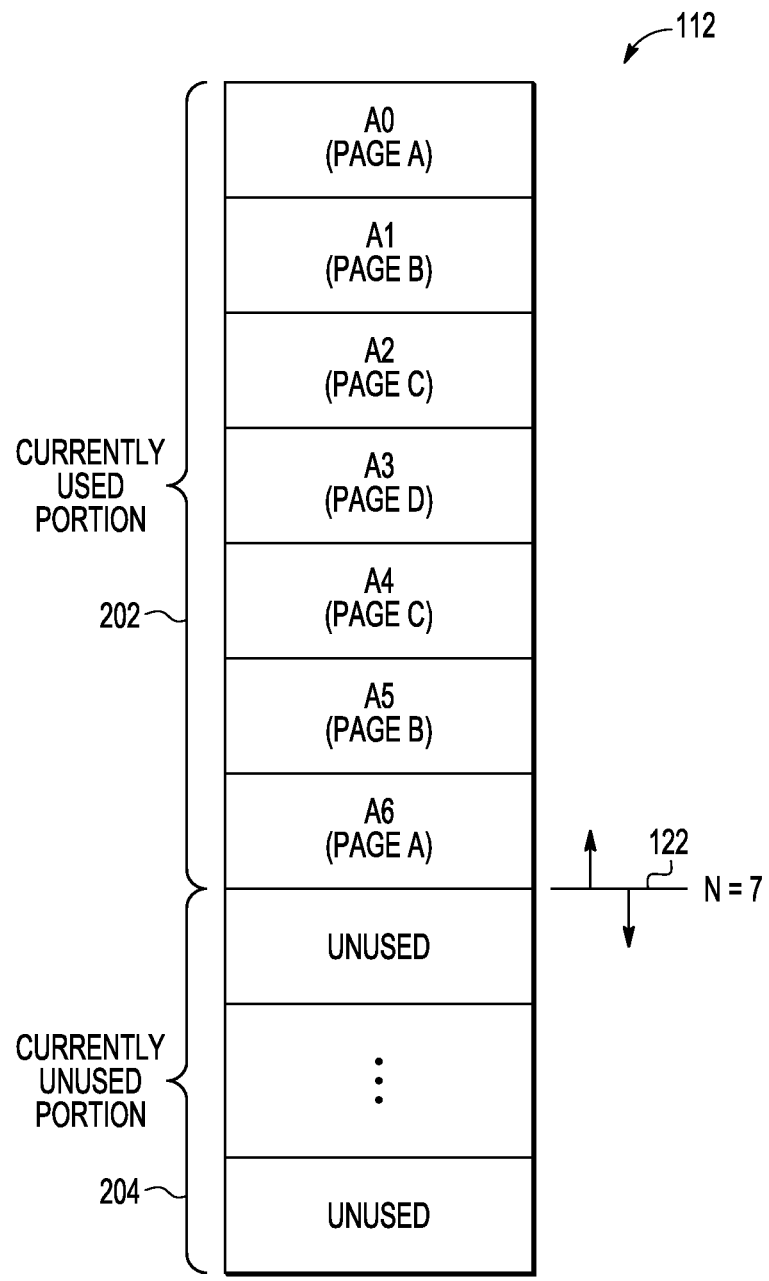
FIG. 2 is a block diagram of an example embodiment for a scheduling queue buffer.

FIG. 2 is a block diagram of an example embodiment for scheduling queue (SQ) buffer 112. For example embodiment 200, the threshold SQ occupancy level (N) 122 is currently set to seven (e.g., N=7). As such, seven access requests from A0 to A6 are stored in a used portion 202 of the buffer 112, and the remaining unused portion 204 of the buffer does not store access requests. As described herein, the threshold SQ occupancy level (N) 122 is adaptively adjusted based upon PHD determinations for each received request. Further, the threshold SQ occupancy level (N) 122 can be based upon an average PHD determined for a window of previous access requests. As described further below, the average PHD value represents an estimate of the average number of access requests that if stored within the SQ buffer 112 would include at least two access requests that are accessing the same page within memory 108.

For the embodiments described herein, page hit distance (PHD) refers to the number of access requests until the same page is to be accessed within the memory 108 inclusive of the last access to the same page. As such, consecutive accesses to the same page would have a PHD of one (PHD=1), and accesses that see no other access to the same page within a time window for stored page accesses will have a null value for its PHD value (PHD=0). Looking to access request A0 for embodiment 200, the page hit distance is six (6) because access request A6 is the next access request also accessing PAGE A. For access request A1, the page hit distance (PHD) is four (4) because access request A5 is the next access request also accessing PAGE B. The page hit distance (PHD) is two (2) for access request A2 because access request A4 is the next access request also accessing PAGE C. The page hit distance (PHD) for access request A3 is considered to be a null value as there are no other access requests stored in buffer 112 also accessing PAGE D. The PHD for each access can similarly be determined based upon previously accessed pages. As described further below, a history buffer can be used to store previously accessed pages for prior page accesses, and this history buffer can be used to determine the PHD value for each new access and to store the determined PHD values.

It is noted that page hit distance as used herein is different from reuse distance (RD) for cache memories. Reuse distance (RD) is typically determined by a number of unique cache accesses within a window of time since last access to same page. For example, if embodiment 200 were representing cache accesses, a typical reuse distance (RD) calculation for a cache memory would be three (3) with respect to access request A0 (PAGE A) as there are only three unique page accesses to other pages within access requests A1 to A6. In contrast, as described above, the page hit distance (PHD) determinations made herein are based upon a number of memory access requests until the same page is identified for access by a previous access request.

Figure 3:
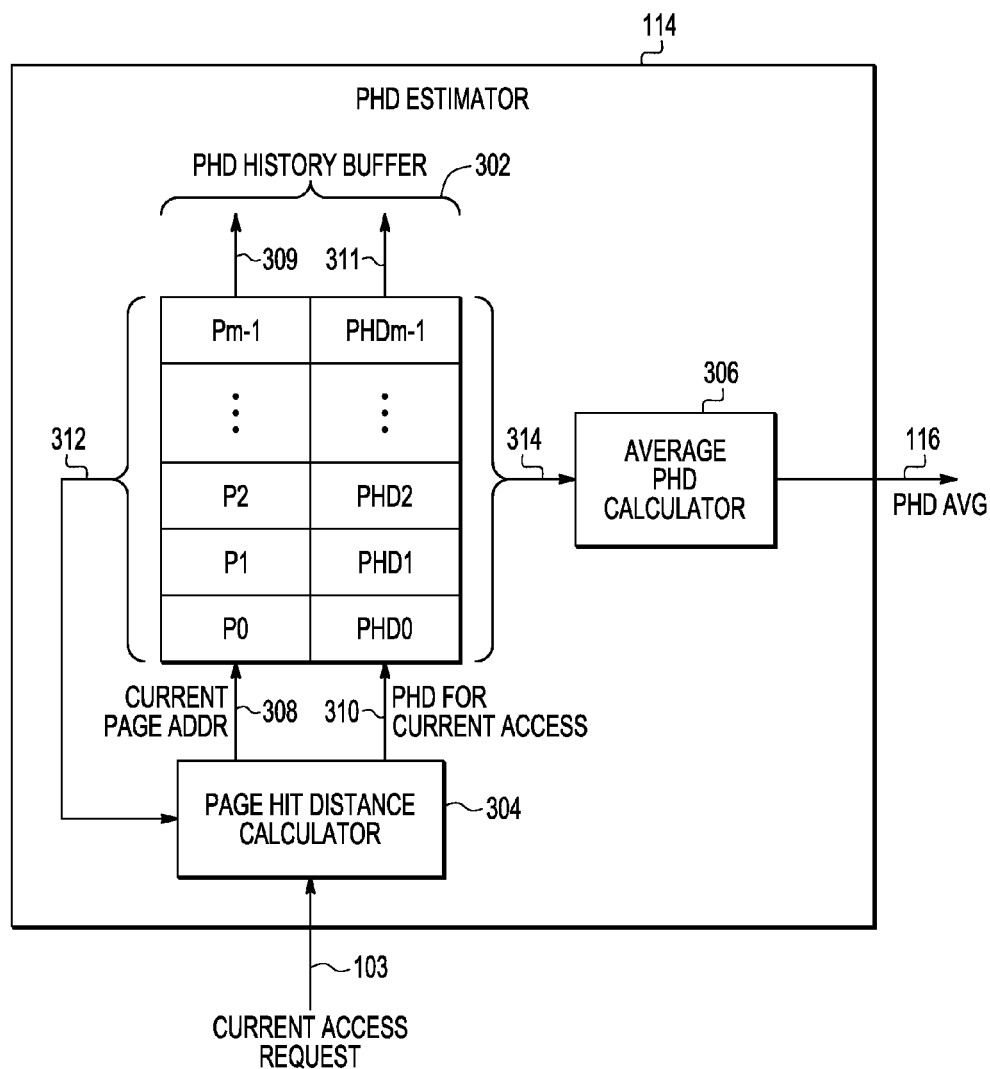
FIG. 3 is an example embodiment for a page hit distance estimator that generates an average page hit distance over a window of previous access requests and includes a page hit distance calculator, a page hit distance history buffer, and an average page hit distance calculator.

FIG. 3 is an example embodiment for PHD estimator 114 that includes a page hit distance (PHD) calculator 304, a PHD history buffer 302, and average PHD calculator 306. The PHD history buffer 302 stores page addresses identified by M previous access requests from $P_0$ to $P_{M-1}$ and also stores PHD values from $PHD_0$ to $PHD_{M-1}$ associated with these previous access requests. The current access request 103 is received by PHD calculator 304, and the PHD calculator 304 uses the page access information 312 stored in the PHD history buffer 302 to determine the PHD for the current access request 103. The current page address 308 is added to the history buffer 302 as page address $P_0$ and the oldest page address $P_{M-1}$ is removed as indicated by arrow 309. Similarly, the current PHD 310 is added to the history buffer 302 as page hit distance $PHD_0$ and the oldest page hit distance $PHD_{M-1}$ is removed as indicated by arrow 311. The average PHD calculator 306 uses the stored PHD values 314 to determine the average PHD value 116, for example, by dividing the total of the PHD values by the total number of stored PHD values (e.g., AVERAGE PHD=PHD TOTAL/NUMBER OF PHDs). It is noted that during the steady state operation of the system, the PHD history buffer 302 will be full, and the total number of PHD values stored will be same as the size (e.g., number of entries) of the PHD history buffer 302. As such, it is also noted that the average PHD can alternatively be determined by dividing the sum of the PHDs for all accesses stored in the PHD history buffer 302 by the number of entries within the buffer (e.g., AVERAGE PHD=PHD TOTAL/SIZE OF BUFFER). Other techniques could also be used, if desired, to determine the average PHD value.

An average PHD value of N can be used to represent an adaptive estimate that, in the current phase of execution, on an average, there is one (1) page hit for every N access transactions. Further, an average PHD value of null (N=0) represents that there is no page reuse in the current window of execution. As an example, the TABLE below represents a PHD history buffer of size 5 (i.e., 5 entries) with corresponding PHD values shown for each entry in the table. For the example buffer and PHD values provided in the TABLE, the average PHD would be 4 (e.g., Average PHD=(7+0+2+4+5)/5=4).

TABLE

EXAMPLE PHD VALUES FOR HISTORY BUFFER

| Access | PHD Value |
|--------|-----------|
| A4 | 7 |
| A3 | 0 |
| A2 | 2 |
| A1 | 4 |
| A0 | 5 |

Thus, for each access request 103, the page hit distance (PHD) is determined by the PHD calculator 304 as the number of access requests within buffer 302 since the last access request to the same memory page. This current PHD is calculated based on the page information 312 for a window of M past access requests that are stored within history buffer 302. Next, for each access request, the average PHD value 116 is updated by the average PHD calculator 306 using a rolling average based upon the PHD values 314 stored within buffer 302 for the window of M access requests. As one example, it is noted that M can be selected in a range of between 10 to 1000 access requests, although other numbers for M could also be used, if desired. In one particular embodiment, M can be selected to be 50 access requests, although other values for M could also be used, if desired. It is noted, however, that the size (M) of the history buffer 302 is preferably greater than the size of the scheduling queue (SQ) buffer 112, and these sizes can be selected, for example, based upon hardware constraints (e.g., available area, power requirements, etc.) and/or other considerations.

As indicated above, the threshold SQ occupancy level (N) 122 for the SQ buffer 112 can be set equal to the average PHD value 116 and/or can be otherwise based upon the PHD determinations and/or the average PHD value 116. For example, the threshold SQ occupancy level (N) 122 can be adaptively updated for each access request based upon the PHD values 314 and/or the average PHD value 116 that are updated for each access request. In addition, the threshold SQ occupancy level (N) 122 can be bounded such that it remains between 1 to the maximum size of the SQ buffer 112 even if the average PHD value 116 drops below this range or rises above this range. Other bounded ranges for the threshold SQ occupancy level (N) 122 could also be selected and used, if desired.

Figure 4:
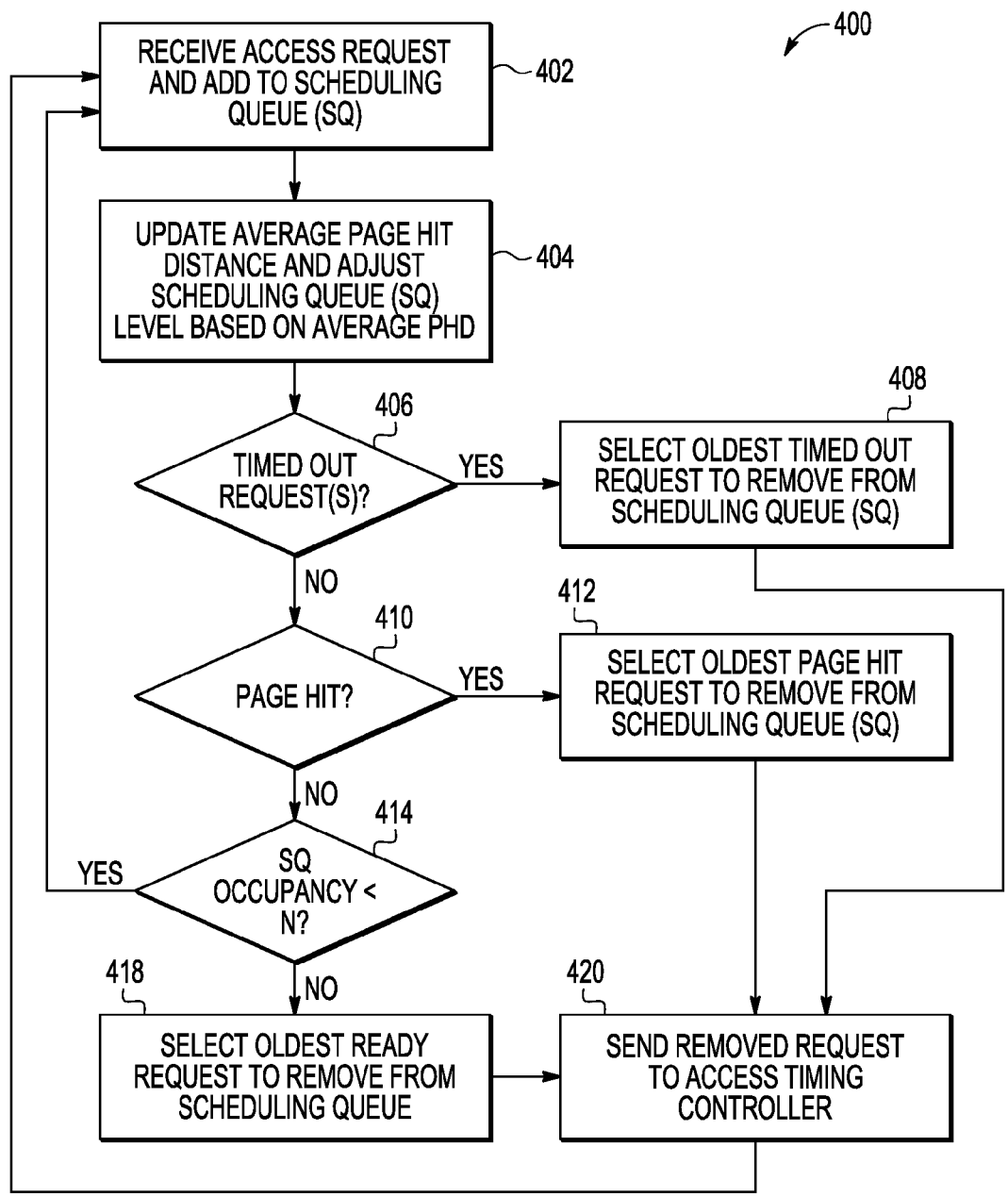
FIG. 4 is a process flow diagram of an example embodiment that uses an average page hit distance to adaptively determine a number of access requests to store in a scheduling queue buffer.

FIG. 4 is a process flow diagram of an example embodiment 400 that uses an average page hit distance (PHD) to determine a number (N) of access requests to store in a scheduling queue (SQ) buffer. In block 402, an access request is received and the access request is added to the SQ buffer 112. In block 404, the average page hit distance PHD is updated, and the threshold level (N) 122 for the scheduling queue (SQ) buffer is adjusted based upon the average page hit distance (e.g., N=Average PHD). In block 406, a determination is made whether or not any access requests have been stored within the SQ buffer for longer than a selected timeout period. If "YES," then flow passes to block 408 where the oldest timed-out (TO) request is selected and removed from the scheduling queue (SQ) buffer. If "NO," then flow passes to block 410 where a determination is made whether or not one of the access requests within the SQ buffer 112 represents a page hit with respect to the currently open page(s) in the memory. If "YES," then flow passes to block 412 where the oldest page-hit access request is selected and removed from the scheduling queue (SQ) buffer 112. If "NO," then flow passes to block 414 where a determination is made whether or not the scheduling queue (SQ) occupancy is compared to the threshold level (N) 122 for the SQ buffer 112. For example, a determination can be made if the SQ occupancy is less than the threshold SQ occupancy level (N) 122. If "YES," then flow passes back to block 402. If "NO," then flow passes to block 418 where the oldest access request ready for processing is selected and removed from the scheduling queue (SQ) buffer 112. Block 420 is reached from blocks 408, 412, or 418. In block 420, the removed access request is sent to the access timing controller so that appropriate access control signals can be sent to the memory to access the page identified in the access request removed from the scheduling queue (SQ) buffer 112.

It is noted that determination block 414 in embodiment 400 provides the adaptive adjustments to the number of access requests stored within the scheduling queue buffer 112 based upon the threshold SQ occupancy level (N) 122, as described herein. This number (N) of access requests can be based upon an average page hit distance (PHD) determined for a number (M) of previous access requests. This number (M) of previous access requests can be selected based upon manufacturing data, empirical data, and/or other desired parameters. It is also noted that the determination blocks 406 and 410 add additional efficiencies to the embodiment 400, but could be removed while still taking advantage of the adaptive adjustment provided by determination block 414. Other variations can also be implemented.

As indicated above, the adaptive control of the number of access requests stored in the SQ buffer 112 based upon PHD determinations assumes that the near future is likely to closely resemble recent past, particularly in the context of average PHD. This assumption was tested using 49 test workloads under the following conditions: (1) average PHDs were calculated for each access request within the workloads using a window length of the previous 50 access requests, (2) the change in average PHD was calculated from each access request to the next, and (3) the number of times the change in average PHD exceeded ±1 was counted. It was found that for none of the workload tests resulted in the average PHD changing by more than ±1 during the test. As such, the assumption that average PHD is a slow changing parameter that can be used as a characteristic of the workload was found to be a reasonable and viable assumption.

As described herein, a variety of embodiments can be implemented and different features and variations can be implemented, as desired.

In one embodiment, a method for scheduling accesses to memory is disclosed that includes receiving an access request for a memory storing a plurality of pages of data where the access request identifies a page of data to be accessed within the memory, adding the access request to a scheduling queue buffer, adjusting a threshold occupancy value for the scheduling queue buffer based upon the access request and historical data for previous access requests, comparing a number of access requests stored within the scheduling queue buffer to the threshold occupancy value, and determining whether to remove an access request from the scheduling queue buffer based upon the comparison. For further embodiments, the method includes repeating the receiving, adding, adjusting, comparing, and determining steps until a determination is made to remove an access request, and then removing an access request from the scheduling queue buffer and using the removed access request to access a page within the memory.

For other embodiments, the adjusting step includes determining a page hit distance for the access request, using the page hit distance to update historical page hit distance data associated with previous access requests, and adjusting the threshold occupancy value based upon the updated historical page hit distance data, where page hit distance represents a number of previous access requests before a same page within the memory is accessed as the received access request. In addition, the method can further include determining an average page hit distance for the historical page hit distance data and using the average page hit distance to adjust the threshold occupancy value. Further, the method can include, storing information for a plurality of previous access requests within a history buffer to provide the historical page hit distance data. Still further, for each received access request, the method can further include storing in the history buffer an entry including a page accessed by the access request and a page hit distance associated with the access request, and removing an oldest entry within the history buffer once the history buffer is full.

For further embodiments, the method can include removing an access request from the scheduling queue buffer when it has remained within the scheduling queue buffer past a time out period, and using the removed access request to access the memory. In addition, the removing step can be performed before the comparing step. For still further embodiments, the method can include removing an access request from the scheduling queue buffer when it accesses a currently open page in the memory, and using the removed access request to access the memory. In addition, the removing step can be performed before the comparing step.

In another embodiment, a memory controller is disclosed that includes a scheduling queue buffer and a schedule. The scheduling queue buffer is coupled to receive access requests for a memory and to store a plurality of the access requests where each access request identifies a page of data to be accessed within the memory and where a number of access requests stored in the scheduling queue buffer is based upon a threshold occupancy value for the scheduling queue buffer. The scheduler is configured to adjust the threshold occupancy value based upon each access request and historical data for previous access requests and to remove access requests from the scheduling queue buffer based upon a comparison of a number of access requests stored in the scheduling queue buffer to the threshold occupancy value. For further embodiments, the memory can be a dynamic random access memory (DRAM) including one or more arrays of DRAM memory cells.

For additional embodiments, the memory controller can further include a page hit distance estimator coupled to receive the access requests and to determine page hit distances for the access requests based upon historical page hit distance data associated with previous access requests, and the scheduler can be configured to adjust the threshold occupancy value based upon the historical page hit distance data where page hit distance represents a number of previous access requests before a same page within the memory is accessed as the received access request. In addition, the page hit distance estimator can be further configured to determine an average page hit distance for the historical page hit distance data, and the scheduler can be configured to adjust the threshold occupancy value based upon the average page hit distance. Further, the page hit distance estimator can include a history buffer to store the historical page hit distance data for a plurality of access requests. Still further, the history buffer can include an entry for each of the plurality of access requests where each entry includes a page accessed by the access request and a page hit distance value associated with the access request.

For further embodiments, the scheduler can be configured to remove an access request from the scheduling queue buffer when it has remained within the scheduling queue buffer past a time out period. In addition, the scheduler can be configured to remove an access request from the scheduling queue buffer when it accesses a currently open page in the memory. For other embodiments, the scheduling queue buffer can be configured to receive the access requests from one or more processors. For still further embodiments, the memory controller can include an access timing controller coupled to receive access requests from the scheduler and to provide access control commands to the memory.

It is noted that the functional blocks, devices, and/or circuitry described herein, including those described with respect to the memory controller 110, can be implemented using hardware, software, or a combination of hardware and software. In addition, one or more processing devices executing software and/or firmware instructions can be used to implement the disclosed embodiments. It is further understood that one or more of the operations, tasks, functions, or methodologies described herein can be implemented, for example, as software, firmware and/or other program instructions that are embodied in one or more non-transitory tangible computer readable mediums (e.g., data storage devices, FLASH memory, random access memory, read only memory, programmable memory devices, reprogrammable storage devices, hard drives, floppy disks, DVDs, CD-ROMs, and/or any other tangible storage medium) and that are executed by one or more central processing units (CPUs), controllers, microcontrollers, microprocessors, hardware accelerators, processors, and/or other processing devices to perform the operations and functions described herein.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. A method for scheduling accesses to memory, comprising:
    receiving an access request for a memory storing a plurality of pages of data, the access request identifying a page of data to be accessed within the memory;
    adding the access request to a scheduling queue buffer;
    adjusting a threshold occupancy value for the scheduling queue buffer based upon the access request and historical data for previous access requests;
    comparing a number of access requests stored within the scheduling queue buffer to the threshold occupancy value; and
    determining whether to remove an access request from the scheduling queue buffer based upon the comparison.

2. The method of claim 1 further comprising, repeating the receiving, adding, adjusting, comparing, and determining steps until a determination is made to remove an access request, and then removing an access request from the scheduling queue buffer and using the removed access request to access a page within the memory.

3. The method of claim 1, wherein the adjusting step comprises:
    determining a page hit distance for the access request;
    using the page hit distance to update historical page hit distance data associated with previous access requests; and
    adjusting the threshold occupancy value based upon the updated historical page hit distance data;
    wherein page hit distance represents a number of previous access requests before a same page within the memory is accessed as the received access request.

4. The method of claim 3, further comprising determining an average page hit distance for the historical page hit distance data and using the average page hit distance to adjust the threshold occupancy value.

5. The method of claim 4, further comprising storing information for a plurality of previous access requests within a history buffer to provide the historical page hit distance data.

6. The method of claim 5, wherein for each received access request, the method further comprises storing in the history buffer an entry including a page accessed by the access request and a page hit distance associated with the access request, and removing an oldest entry within the history buffer once the history buffer is full.

7. The method of claim 1, further comprising removing an access request from the scheduling queue buffer when it has remained within the scheduling queue buffer past a time out period, and using the removed access request to access the memory.

8. The method of claim 7, wherein the removing step is performed before the comparing step.

9. The method of claim 1, further comprising removing an access request from the scheduling queue buffer when it accesses a currently open page in the memory, and using the removed access request to access the memory.

10. The method of claim 9, wherein the removing step is performed before the comparing step.

11. A memory controller, comprising:
    a scheduling queue buffer coupled to receive access requests for a memory and to store a plurality of the access requests, each access request identifying a page of data to be accessed within the memory, and a number of access requests stored in the scheduling queue buffer being based upon a threshold occupancy value for the scheduling queue buffer; and
    a scheduler configured to adjust the threshold occupancy value based upon each access request and historical data for previous access requests and to remove access requests from the scheduling queue buffer based upon a comparison of a number of access requests stored in the scheduling queue buffer to the threshold occupancy value.

12. The memory controller of claim 11, wherein the memory comprises a dynamic random access memory (DRAM) including one or more arrays of DRAM memory cells.

13. The memory controller of claim 11, further comprising a page hit distance estimator coupled to receive the access requests and to determine page hit distances for the access requests based upon historical page hit distance data associated with previous access requests, and wherein the scheduler is configured to adjust the threshold occupancy value based upon the historical page hit distance data, and wherein page hit distance represents a number of previous access requests before a same page within the memory is accessed as the received access request.

14. The memory controller of claim 13, wherein the page hit distance estimator is further configured to determine an average page hit distance for the historical page hit distance data and wherein the scheduler is configured to adjust the threshold occupancy value based upon the average page hit distance.

15. The memory controller of claim 14, wherein the page hit distance estimator comprises a history buffer to store the historical page hit distance data for a plurality of access requests.

16. The memory controller of claim 15, wherein the history buffer has an entry for each of the plurality of access requests, each entry including a page accessed by the access request and a page hit distance value associated with the access request.

17. The memory controller of claim 11, wherein the scheduler is configured to remove an access request from the scheduling queue buffer when it has remained within the scheduling queue buffer past a time out period.

18. The memory controller of claim 11, wherein the scheduler is further configured to remove an access request from the scheduling queue buffer when it accesses a currently open page in the memory.

19. The memory controller of claim 11, wherein the scheduling queue buffer is configured to receive the access requests from one or more processors.

20. The memory controller of claim 11, further comprising access timing controller coupled to receive access requests from the scheduler and to provide access control commands to the memory.

* * * * *